...

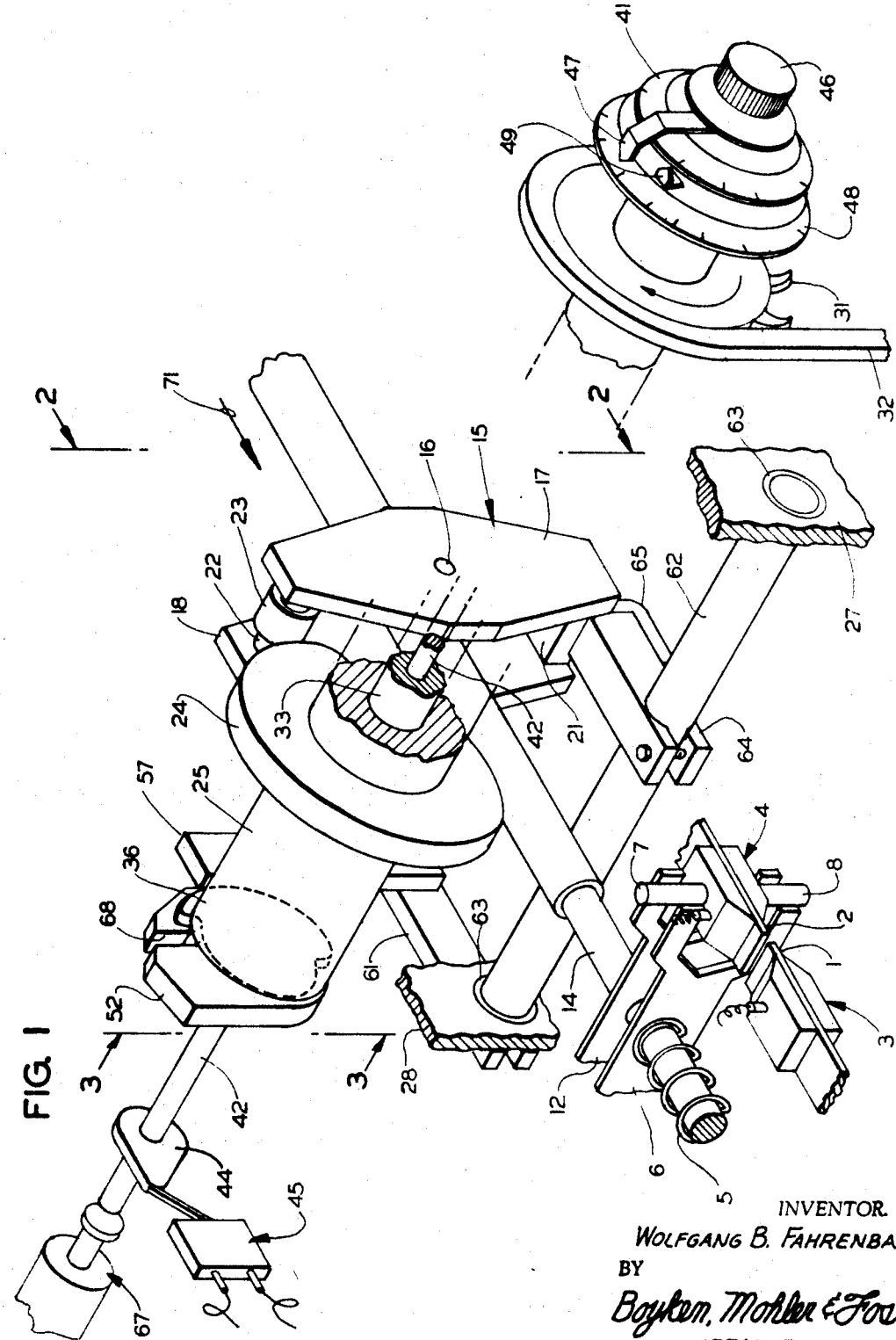

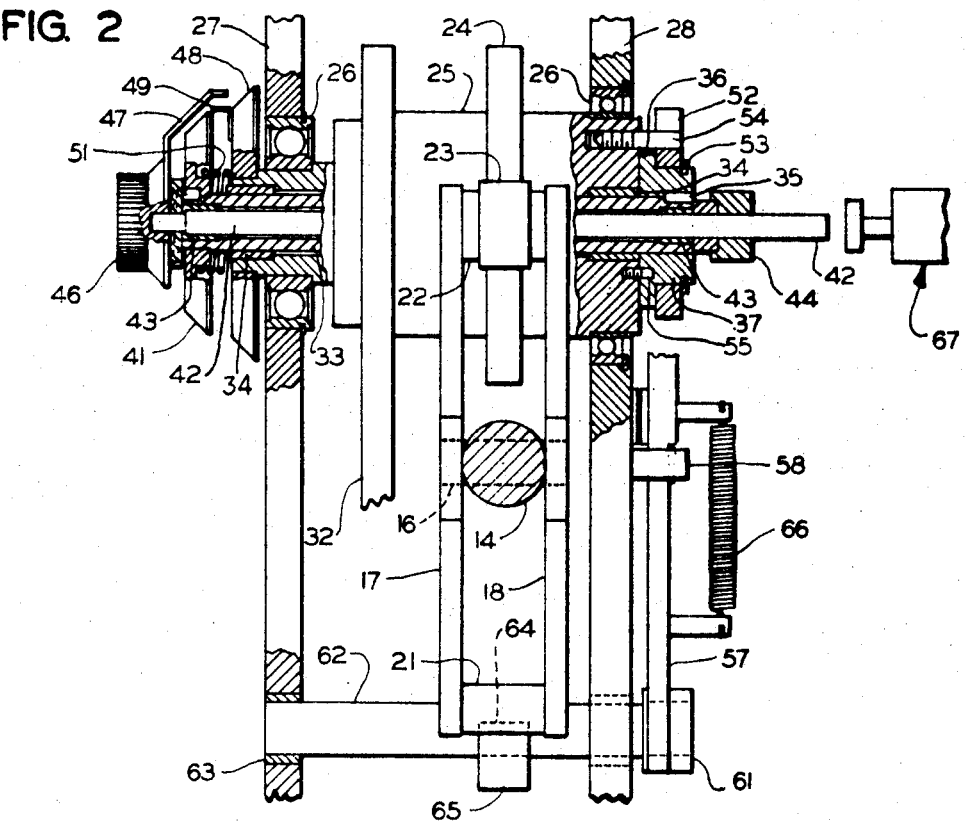
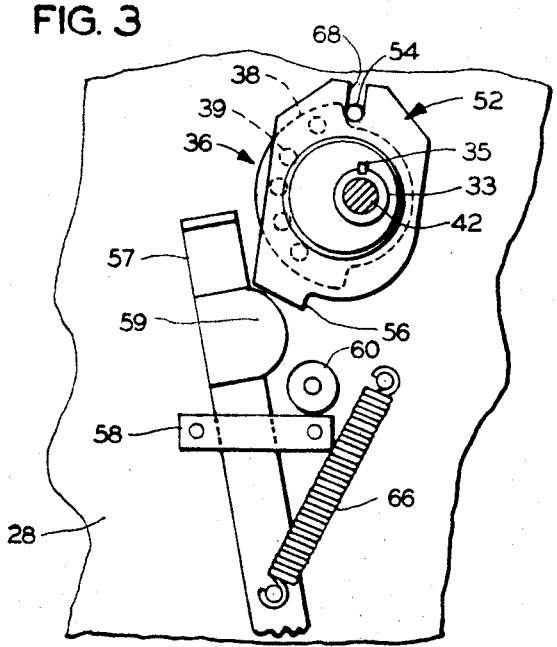
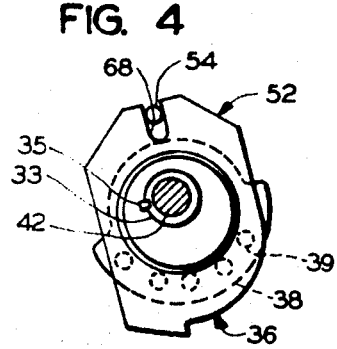

United States Patent Office 3,400,239
Patented Sept. 3, 1968

3,400,239
FLASH WELDER CONTROL
Wolfgang B. Fahrenbach, Oakland, Calif., assignor to Stryco Manufacturing Co., San Francisco, Calif., a corporation of California
Filed Aug. 7, 1964, Ser. No. 388,157
5 Claims. (Cl. 219—97)

ABSTRACT OF THE DISCLOSURE

An apparatus for flash welding includes a control for determining the flashing distance and upset point of the workpieces. The control consists of two phaseable, concentrically arranged shafts fixed to respective cams and pointer indexing means for indicating the positions of the shafts. A first cam allowing accelerated movement serves to control the speed at which the workpieces move together by the engagement of the cam with a spring biased workpiece holder. A second eccentrically fixed cam serves to trip the engagement of the first cam with the workpiece holder for establishing the upset.

---

The present invention relates to flash welders in general and more particularly to an improved control unit of flash welders and an improved method of annealing a weld.

In flash welding the ends of the two pieces of work to be welded are aligned in close proximity and are securely clamped in a pair of vises respectively. A slight gap is left between the ends of the pieces of work. Electrodes are attached to the two said ends and high current is introduced through the work pieces. As the current jumps the gap between the ends of the work pieces great heat is generated and the ends begin to melt. Slight bridges of molten metal may be formed between the mating surfaces of said ends. When this happens there is a slight explosion and the molten debris is flashed away.

One of the vises, being movable, is moved toward the other stationary vise as flashing occurs, thereby maintaining a substantially constant gap between the ends of the pieces of work. The distance which the movable vise moves during flashing is called flashing distance.

When sufficient flashing has occurred so that the work pieces are completely molten across their mating ends and an oxygen void is created in the gap therebetween, a point known as the upset point is reached. At upset point the movable die is forced unrestrained toward the stationary die through what may be called a welding distance, and the molten ends of the work pieces are forced into welding engagement. The high current is turned off and the molten metal of the weld begins to cool. At this point the weld has been completed.

Flashing distance is a function of time and varies with the type of material to be welded and the dimensions of the mating surfaces. Thus, flashing distance is variable and must be changed with work pieces of different characteristics and dimensions. Heretofore, various devices have been used to control the movement of one vise toward the other during flashing. Such devices have usually been large and quite complicated and time consuming to operate.

After the weld is completed it must be annealed in order to be durable. Often the weld is annealed in the same machine or flash welder.

In annealing the vises are usually spread farther apart from the point of the weld than in the welding process. Current is again applied to the now welded workpiece and is gradually increased in a time first phase until the weld piece becomes cherry red. The workpiece is maintained in this cherry red condition for a timed second phase.

During a timed third phase the current and temperature of the workpiece is gradually decreased, thereby completing the annealing process.

It has been the usual procedure to completely free the movable vise of all restraining forces during annealing. As the workpiece is heated it expands somewhat, thereby forcing the dies apart and drawing them together again as the workpiece cools. If the movable die is even slightly balky due to wear, age, or obstructing dirt or rust, the weld can be caused to buckle slightly as the workpiece expands. It is therefore a main object of the present invention to provide a method of annealing wherein the annealing is done under tension and the movable die is forced apart from the stationary die independently of the expanding forces of the workpiece. The tension is maintained on the movable die even as the workpiece cools and contracts, thereby slightly resisting the contracting forces of cooling.

It is another main object of this invention to provide a compact, concentric control system for a flash welder as opposed to the relatively bulky linear systems of past flash welders.

Still another object of this invention is the provision of a control unit which will allow the movable vise to move toward the stationary vise with greater speed as the flashing process progresses and the metal becomes more molten.

It is another object of this invention to provide a control system for a flash welder wherein all of the functions of flashing distance and upset point are set at a single, easily attainable location.

It is still another object of this invention to provide a control system for a flash welder wherein the controls are easily manipulated and require no high degree of special training on the part of an operator.

Yet another object of this invention is to provide a control system for a flash welder wherein the readiness of the machine and the accuracy of the settings are quickly, visually determinable.

Other objects and advantages of this invention will be obvious from the description and the drawings.

In the drawings, FIG. 1 is a fragmentary, semidiagrammatic, isometric view of the control unit of this invention.

FIG. 2 is an elevational view of the unit of FIG. 1 as seen substantially along line 2—2 thereof.

FIG. 3 is an elevational view of the unit of FIG. 1 as seen substantially along line 3—3 of FIG. 1 or the right hand side of FIG. 2.

FIG. 4 is a fragmentary view of portions of FIG. 3 in a different position.

As seen in FIG. 1 the ends of the pieces of work to be joined by welding are indicated at 1 and 2. Ends 1 and 2 are securely held in alignment in working holding vises 3 and 4 respectively. The vises are, of course, attached to supporting structure on the flash welder which structure is not shown. As far as the flashing process is concerned vise 3 is stationary. Vise 4 may be mounted in a sleeve bearing on the supporting structure of the flash welder and is thereby movable in a straight line toward and away from vise 3. Electricity may be directed through the workpieces 1 and 2 through their secure connection with vises 3 and 4 which have electrodes and conductors connected thereto.

Vise 4, the movable vise, is spring urged away from vise 3 by a spring 5 or possibly a plurality of such springs acting on a yoke 6 which is, in turn, in engagement with posts 7 and 8 which extend respectively upwardly and downwardly from each jaw of vise 4. It can be seen that yoke 6 is not in secure engagement with posts 7 and 8 but rather is in yieldable engagement therewith and can be moved independently of vise 4, said vise being movable independently of yoke 6 also.

A similar yoke 12 is in similar yieldable engagement with posts 7 and 8 at the opposite side from the engagement of those posts with yoke 6. Yoke 12 can be moved independently of vise 4 and vice versa. Yokes 6 and 12 are mounted on vertical pivots (not shown) and are adapted to swing in large radius horizontal arcs independently of each other. Connected to yoke 12 and extending at substantially a right angle thereto is a horizontally disposed rod 14. At its opposite end from yoke 12 rod 14 is connected to a standard, pneumatic diaphragm (not shown) which diaphragm provides the force for moving vise 4 toward stationary vise 3.

Intermediate its ends rod 14 extends through a vertical tandem lever assembly which is pivotally connected to said rod by a horizontal pivot 16 extending approximately centrally through both levers 17 and 18 of said assembly and through said rod 14 (FIGS. 1 and 2). The lower ends of levers 17 and 18 are rigidly connected in spaced, parallel relation by a spacer 21 of rectangular cross section. The upper ends of levers 17, 18 are similarly connected by shaft 22 on which is rotatably mounted a roller or cam follower 23.

Cam follower 23 is adapted to engage the peripheral edge of a vertically disposed cam member 24 (FIGS. 1 and 2) which is rigidly secured to a horizontally disposed, hollow shaft 25. Adjacent its opposite ends shaft 25 is rotatably mounted in bearings 26 on structural walls 27 and 28 of the flash welder, as best seen in FIG. 2.

Cam 24 is adapted to be rotated clockwise as seen in FIG. 1 and when so rotated has a radially decreasing peripheral edge. Means for rotating shaft 25 and therefore cam 24 is provided by a timing gear 31 which is rigidly secured to shaft 25. Timing gear 31 is adapted to be engaged by motor driven timing belt 32. It is obvious that this arrangement may just as well be a chain and sprocket or any other positive drive means.

It can be seen in FIGS. 1 and 2 that a second hollow shaft 33 is disposed within hollow shaft 25. Shaft 33 is rotatably and slidably supported within shaft 25 as by bushings 34 (FIG. 2). Pinned to one end of shaft 33, as by pin 35, is a hammer cam locking ring 36 which will be described later in greater detail. On the opposite end of shaft 33 outwardly of wall 27, which may be the front wall of the flash welder, is a dial 41. Dial 41 controls the setting for the upset point.

Extending through shaft 33 is a rod 42 which is supported for rotation within said shaft by bushings 43 (FIG. 2). Secured to the rearward end or left hand end of rod 42, as seen in FIG. 1, is a switch tripping cam 44 which is adapted to engage the armature of a limit switch 45. Switch 45 is electrically connected to the motor (not shown) which drives timing belt 32. Secured to the opposite end of shaft 42, forwardly of dial 41, is a serrated knob 46 and a pointer 47.

Pointer 47 extends backwardly over dial 41 into close proximity with a second larger dial 48 disposed between dial 41 and wall 27. Dial 48 is rigidly secured to the forward end of shaft 25 and is adapted to continually indicate the actual position of cam member 24. A coil spring 51 is interposed between dials 41 and 48 around shaft 33 (FIG. 2).

As seen in FIG. 2 locking ring 36, secured to the rearward end of shaft 33, has a boss 37 formed integrally therewith and extending rearwardly therefrom. In FIG. 3 it can be seen that locking ring 36 and boss 37 are mounted on shaft 33 eccentrically of the common axis of said shaft and rod 42. Rotatably received on boss 37 is a hammer cam 52 which is retained on said boss by an O-ring 53. Hammer 52 is pinned to shaft 25 for rotation therewith by pin 54. Locking ring 36 is pinned to shaft 25 for rotation therewith by pin 55.

As hammer cam 52 rotates with shaft 25 a raised portion 56 on said cam is adapted to engage the upper end of a vertically disposed link 57. Link 57 extends alongside wall 28 and may be held in a substantially vertical position by a guide member 58 secured to wall 28. At its lower end link 57 is pivotally connected to a substantially horizontally disposed link 61. At the end opposite its connection to link 57, link 61 is adjustably secured, as by a clevis arrangement, to a horizontally disposed rod 62 extending forwardly therefrom. Rod 62 is rotatably mounted at either end in walls 27 and 28 as by bushings or bearings 63.

Adjustably secured to rod 62 intermediate walls 27 and 28 is a sear link 64. At the end opposite rod 62 sear link 64 is adapted to engage the rectangular spacer 21 rigidly secured between the lower ends of levers 17 and 18. Sear link 64 may have a stop member 65 secured thereto to limit upward movement of said sear link by engagement of said stop member with said rectangular spacer. It can be seen that when raised portion 56 of hammer cam 52 engages the upper end of link 57 upon rotation of shaft 25 link 57 will be forced downwardly. Link 61 and rod 62 will act as a crank and force the end of sear link 64, which is in engagement with spacer 21, downwardly. The purpose of this crank and sear arrangement will be described in greater detail in conjunction with the operation of the flash welder control unit.

Mounted on link 57 between its upper end and guide 58, is a cam member 59 which is adapted to engage a stationary roller 60, mounted on structural wall 28, on the downward movement of link 57. This is a fast release device for disengaging the upper end of link 57 from the projection 56 on cam 52, the purpose of which will be described later.

It can be seen in FIGS. 2 and 3 that a coil spring 66 is connected between link 57 and wall 28 to provide a spring return means for link 57 and the crank and sear arrangement to an upper position.

In operation, flashing distance and upset point should be properly set on the control unit before the ends of the pieces of work to be welded are positioned in vises.

If the flash welder is to be used to weld only work pieces of the same metal and the same cross-sectional dimensions, the flashing distance and the upset point could be set one time and probably never changed. However, the machine is especially adaptable to welding a wide range of steels having a wide range of cross-sectional dimensions. Thus, it can be seen that the flashing distance and the upset point will be different with each different application of the flash welder because of the different time required in each application for the metal to reach that molten stage at which it can be welded.

Upset point is set with the forward dial 41 which is used to manipulate the locking ring 36 and hammer cam 52. Ring 36 and cam 52 form means for varying the upset point. As seen in FIG. 3 locking ring 36 has a portion 38 of greater radius on one side thereof. Formed in portion 38 is an arcuate row of openings 39 which openings are adapted to receive locking ring retaining pin 55. The row of openings 39 is formed about the axis of shaft 33 and rod 42 and not about the center point of locking ring 36. Thus, when locking ring 36 is rotated, the motion of boss 37 is eccentric to the axis of shaft 33 but the openings 39 revolve evenly about the axis of rotation of the shaft.

Pin 54 is received in a slot in hammer cam 52. Cam 52 is, in turn, received on the eccentric boss 37. Since locking ring 36 is formed to a shorter radius on the side opposite raised portion 38 said locking ring is free to make about one-half of a rotation without being obstructed by pin 54. As locking ring 39 is rotated the relative position of hammer cam 52 to shaft 25 and therefore cam member 24 is changed relatively little. Thus with a wide range of movement available at the operator's end of the flash welder, minute and accurate changes can be made in the upset point. The limits of the movement of ring 36 is seen in FIGS. 3 and 4, in which the comparative minor movement of the hammer cam 52 in relation to the much larger movement of ring 36 is illustrated.

Referring to FIG. 2, in order to change the relative position of hammer cam 52 to cam member 24, knob 46 and dial 41 are depressed in the direction of dial 48 against the urgency of spring 51. As this is done rod 42 and shaft 33 slide rearwardly within hollow shaft 25. The rear end of rod 42 engages a pneumatic switch 67 which is connected to the air diaphragm (not shown). When switch 67 is tripped all pneumatic forces on the control unit are released.

Dial 41 may be marked off in 1/32 of an inch increments in a range of from possibly 3/32 of an inch to possibly 3/16 of an inch. Dial 41 is turned until the desired upset setting is in alignment with an upset pointer 49 mounted on dial 48. Since dial 48 continually represents the actual position of cam member 24, when the upset point has been set by dial 41 the relative position between hammer cam 52 and cam member 24 will have been determined.

As knob 46 and dial 41 are pushed rearwardly, locking ring 36 being pinned to shaft 33 is carried rearwardly therewith until locking ring 36 clears pin 55 which is secured in the rearward end of shaft 25. Locking ring 36 is then rotatable with dial 41 and shaft 33. One opening 39 in locking 36 corresponds to each increment marking on the face of dial 41. When the proper upset point is aligned with upset marker 49, knob 46 and dial 41 are released and are urged forwardly by spring 51. Locking ring 36 travels forwardly with shaft 33 and one of the openings 39 of the arcuate row thereof is received on pin 55 thereby again securing locking ring 36 to shaft 25 for rotation therewith.

It should be noted that when locking ring 36 is forced rearwardly it is only moved a sufficient distance to clear pin 55. At this point pin 54 is still engaged in slot 68 in hammer cam 52. Thus, when locking ring 36 is rotated, hammer cam 52 pivots only slightly about pin 54 and is restrained from rotating with locking ring 36. The eccentric mounting of boss 37 on which cam 52 is rotatably received imparts only slight positional changes to cam 52 in relation to shaft 25 and therefore in relation to cam member 24. As noted before, this movement in the present application is in increments of 1/32 of an inch. When dial 41 and knob 46 are returned to their forward spring urged position and locking ring 36 is again locked for rotation with shaft 25 by pin 55, the setting of the upset point is complete.

Flashing distance or the distance between vises 3 and 4 at the beginning of the flashing process is then set. The various increments of flashing distance are marked on the face of dial 48.

Knob 46 and pointer 47 are turned until pointer 47 is in alignment with the desired flashing distance. Rod 42 and cam 44 are rigidly secured to knob 46 and are turned with knob 46. At this time pointer 47 may be at any position on the periphery of dial 48.

It will be noted that the pressure on the air diaphragm is still zero, it having been made so when pneumatic switch 67 was tripped. With the pneumatic pressure at zero vise 4 is forced away from vise 3 by spring 5 and rod 14 is likewise forced away from vise 3 by its engagement with vise 4. Thus lever assembly 15, pivotally secured to rod 14, is in an inert position. Shaft 25 and all of the members attached thereto can be rotated free from restraint. The motor (not shown) which drives shaft 25 through engagement of belt 32 with timing wheel 31 is started and shaft 25 and the dials 41 and 48 at the forward end thereof is rotated through so much of a revolution as is required to allow cam 44 to trip switch 45 again stopping the motor.

The relationship between pointer 47 and cam 44 is such that when cam 44 trips switch 45 pointer 47 will be in an upright position. With pointer 47 in this position the machine operator can readily determine that the machine is ready for use and easily visually check the accuracy of his settings. At this point the workpieces 1 and 2 may be placed in vises 3 and 4. The gap between pieces 1 and 2 can readily be determined by various measuring instruments such as a feeler gauge. Care must be taken to accurately align the mating ends of workpieces 1 and 2.

With the work pieces in position, pneumatic pressure can again be built up in the air diaphragm. Such pressure is more than sufficient to overcome the urgency of spring 5. As rod 14 is urged by the diaphragm in the direction of arrow 71 (FIG. 1), cam follower 23 will engage cam member 24 and spacer 21 will engage sear link 64. The motor to drive timing belt 32 may be started simultaneously with the introduction of high current through workpieces 1 and 2. As previously described the flashing process begins and molten debris is flashed away from the ends of workpieces 1 and 2.

If both the vises 3 and 4 were stationary there would be a tendency for the gap between the ends of said workpieces to widen. A point would be reached at which the current could no longer arc the gap nor would the minute bridges of molten metal be formed. The flashing process would then stop. It is necessary therefore that one vise, vise 4 in this instance, be movable toward the other vise in order to maintain the gap between the work pieces substantially constant and continue the flashing process until an oxygen void exists in said gap and the metal of the work pieces is sufficiently molten to form a weld. As the flashing proceeds, cam 24 is driven in a clockwise direction (FIG. 1) and cam follower 23 is forced against the radially decreasing peripheral edge of said cam member, thereby allowing rod 14 to progress in the direction of arrow 71 and force vise 4 in the direction of vise 3 in a predetermined timed relation to the flashing process.

If the flashing process progressed at a constant speed, rod 14 and vise 4 could move in the direction of arrow 71 at a constant speed. However, as the work pieces are heated, the flashing process tends to gain momentum. Therefore, so that the gap between ends 1 and 2 will not become too wide and result in irregular flashing as the gap widens, and is again narrowed, rod 14 and vise 4 must move in the direction of arrow 71 at an accelerated speed during flashing. The radially decreasing peripheral edge of cam 24 is so constructed as to provide for accelerated movement of rod 14 in the direction of arrow 71 as the flashing process progresses.

At the predetermined moment during flashing when the metal is sufficiently molten on the surface of each workpiece 1 and 2 and the oxygen void exists, the flashing process is upset. This has previously been described as the upset point. At this point the raised portion 56 (FIG. 3) of hammer cam 52 strikes the upper end of link 57 imparting a cranking motion through link 61 and rod 62 to sear link 64. The end of sear link 64 opposite to rod 62 is cranked downwardly and out of engagement with spacer 21. When sear link 64 clears spacer 21, rod 14 moves unrestrained and with great force in the direction of arrow 71 until the molten mating ends of workpieces 1 and 2 meet with great impact.

In order to disengage link 57 from raised portion 56 of cam 52 more quickly than would otherwise be the case, cam member 59 is adapted to engage roller 60 shortly after upset point, thereby forcing link 57 away from cam 52 quickly.

Through separate electrical means (not shown) the high current through work pieces 1 and 2 is immediately cut off at upset point. It can be seen that if the high current passes through workpieces 1 and 2 for even an instant too long massive flashing will occur. If the high current circuit is cut off even an instant too soon the metal pieces 1 and 2 will cool prematurely and not form a solid weld. Shortly after impact and the formation of the weld the air pressure on the pneumatic diaphragm can again be reduced to zero and the now welded workpiece can be removed from vises 3 and 4. The welding process is then complete.

As the weld is quite brittle and unable to withstand stress or flex, it is necessary to anneal the weld in most instances. During annealing the air pressure on the pneumatic diaphragm is reduced to zero. Vise 4 may be spread apart from vise 3 in order to provide a greater area of the workpiece between said vises for dispersion of the heat of annealing. The workpiece need not be removed completely from the vises in proceeding from the welding process to the annealing process.

It can be seen in FIG. 1 that through the engagement of spring urged yoke 6 with posts 7 and 8 of vise 4 the annealing will be done under tension. Current substantially lower than that used in the flashing process is again introduced through the workpiece. The temperature of the workpiece between the vises may be raised in a timed first phase until it is about twelve to thirteen hundred degrees or until the workpiece between the vises is cherry red. The workpiece is maintained at a constant temperature for a timed second phase, at the end of which the current is reduced in a timed third phase allowing the temperature of the workpiece to gradually decrease to about 800 degrees. The current may then be turned off and the annealing process is completed.

Annealing under tension is a radical departure from annealing processes of the prior art. It has been found that the strength, durability and flexibility of the weld is thereby improved, and buckling of the weld eliminated.

As has been pointed out the concentric control unit for a flash welder disclosed herein is extremely compact yet accurate. It can be successfully used by operators with no experience in flash welding and with a minimum amount of training on the particular machine. Because of the extreme accuracy of the machine and the improved method for annealing, welds of unusually and consistently high quality can be made.

It is to be understood that the above detailed description discloses the preferred form of the present invention but it is not intended to be limiting, as other forms and modifications may occur to those skilled in the art which do not depart from the spirit of this invention and which come within the scope of the appended claims.

I claim:
1. Improved controls and indicator means for an electric flash welder having a pair of work holding vises, one vise being movable toward and away from the other vise and operatively connected with moving means for so moving it through a flashing distance, an upset point and a welding distance, including:
 (a) means for upsetting flashing in said flashing distance at a variable upset point including an adjustable release mechanism for releasing restraint on movement of said moving means toward said other vise;
 (b) said release mechanism being operatively connected with adjustment means therefor which is eccentrically, adjustably received on rotatable control mounting means;
 (c) rotatable upset point indicator and adjustment setting means received on said control mounting means remote from said adjustment means and eccentrically disposed with respect to said adjustment means whereby relatively extensive rotation of said indicator means effects relative minor variation in said adjustment means and said upset point.

2. The improved control and indicator means defined in claim 1, including:
 (d) restraining means operatively interposed between said moving means and said one vise to restrain said moving means to a controlled, predetermined movement, said restraining means including:
  (1) a single, rotatable cam member having a radially decreasing peripheral edge thereon so formed as to provide for accelerated movement of said one vise toward said other vise through said flashing distance to said upset point; and,
  (2) a cam follower operatively connected with said one vise and said moving means and adapted to engage said edge of said cam member providing controlled restraint on said moving means through said flashing distance.

3. The improved control and indicator means defined in claim 2, including:
 (e) said cam member being securely mounted on said control mounting means;
 (f) rotatable flashing distance indicator and varying means received on said mounting means at a point remote from said cam means for varying the point on said edge of said cam member at which said cam follower initially engages said edge in a flash welding operation thereby varying flashing distance.

4. The invention defined in claim 3, in which:
 (g) said rotatable upset point indicator means and said rotatable flashing distance indicator means being concentrically received on said control mounting means about a common axis, rotatable relative to each other and closely adjacent each other in overlying, side-by-side relation one to the other.

5. The invention defined in claim 2, including:
 (e) separate rotating means for rotating said control means in one direction only effecting recycling of said control means between flash welding operations by continuing rotation thereof in said one direction.

References Cited
UNITED STATES PATENTS

| | | | |
|---|---|---|---|
| 2,085,049 | 6/1937 | Spire | 219—97 |
| 2,492,200 | 12/1949 | Stieglitz | 219—97 X |
| 2,689,482 | 9/1954 | Doutt | 219—97 X |
| 2,860,231 | 11/1958 | Stone | 219—97 |

RICHARD M. WOOD, *Primary Examiner.*

J. G. SMITH, *Assistant Examiner.*